(12) United States Patent
Tang

(10) Patent No.: US 6,464,073 B1
(45) Date of Patent: Oct. 15, 2002

(54) COMPACT DISC HOLDER

(75) Inventor: Kam Sau Tang, North Point (CN)

(73) Assignee: Triple Keen Industrial Ltd., North Point (HK)

( * ) Notice: Subject to any disclaimer, the term of this patent is extended or adjusted under 35 U.S.C. 154(b) by 0 days.

(21) Appl. No.: 09/711,617

(22) Filed: Nov. 13, 2000

(51) Int. Cl.[7] .............................................. B65D 85/57
(52) U.S. Cl. ................................. 206/310; 206/308.1
(58) Field of Search .......................... 206/308.1, 308.2, 206/310

(56) References Cited

U.S. PATENT DOCUMENTS

| | | | |
|---|---|---|---|
| 4,793,479 A | 12/1988 | Otsuka et al. | 206/310 |
| 5,251,750 A | 10/1993 | Gelardi et al. | 206/310 |
| 5,377,825 A | 1/1995 | Sykes et al. | 206/232 |
| 5,788,068 A | 8/1998 | Fraser et al. | 206/310 |
| 5,944,181 A * | 8/1999 | Lau | 206/308.1 |
| 5,996,788 A * | 12/1999 | Belden, Jr. et al. | 206/310 |
| 6,065,594 A * | 5/2000 | Sankey et al. | 206/310 |
| 6,123,192 A * | 9/2000 | Rufo, Jr. | 206/310 |
| 6,206,185 B1 * | 3/2001 | Ke et al. | 206/308.1 |
| 6,227,362 B1 * | 5/2001 | Cheung | 206/308.1 |
| 6,237,763 B1 * | 5/2001 | Lau | 206/308.1 |
| 6,293,396 B1 * | 9/2001 | Takahashi et al. | 206/310 |

FOREIGN PATENT DOCUMENTS

| | | |
|---|---|---|
| DE | 3425579 A1 | 1/1986 |
| DE | 37 15 187 A1 | 11/1988 |
| EP | 0 356 539 A1 | 3/1990 |
| EP | 0 429 195 A2 | 5/1991 |
| GB | 2 243 145 A | 10/1991 |
| GB | 2 312 665 A | 11/1997 |
| JP | 4-57778 | 4/1992 |
| JP | 5-51082 | 5/1993 |
| JP | 11-152173 | 6/1999 |
| JP | 11-222288 | 8/1999 |
| WO | WO 93/01598 | 1/1993 |

\* cited by examiner

Primary Examiner—Bryon P. Gehman
(74) Attorney, Agent, or Firm—Alix, Yale & Ristas, LLP

(57) ABSTRACT

A compact disc holder includes a base portion, a rigid column extending laterally upward from the inner surface of the base portion to an inner end, and at least one resilient arm extending laterally upward from the inner surface of the base portion to a upper end disposed within a laterally extending bore of the column. The upper end portion of the arm forms an actuator member having an upper surface which is positioned below the inner end of the column. Longitudinally extending first and second disc-retaining lips on the column and arm, respectively, are inserted through the central opening of a compact disc to engage and retain the compact disc. The compact disk is released by inserting an object into the bore of the column to engage and apply pressure to the upper surface of the actuator member, depressing the resilient arm toward the inner surface of the base portion and pivoting the second disc-retaining lip away from the compact disc.

14 Claims, 5 Drawing Sheets

COMPACT DISC HOLDER

BACKGROUND OF THE INVENTION

This invention relates generally to apparatus for holding a compact disc. More particularly, the present invention relates to disc storage containers or cases incorporating such apparatus. A "compact disc" includes conventional 120 mm diameter, laser-readable disc carrying, for example, pre-recorded music, computer software and data, similar recordable discs, and also similar discs of various sizes such as are known or may be developed for recording video material, films, interactive games, and other information or data.

Such compact discs, or "CDs", are generally sold in cases that protect the CD stored therein and also offer some level of theft deterrence. The cases are also suitable for storage of the CD by the purchaser. One conventional case of this type is a clear polystyrene box, known as a "jewel case", wherein the disc is held by a rosette on a separate tray fitted in the case. Another conventional case is a video library box. Such video library boxes generally have a lid portion and a base portion which are connected by a spine portion that acts as a hinge. Integrally molded into the base portion is a rosette for holding the CD. The rosettes found in jewel cases and library boxes typically have four to eight times arranged in a circular formation which releasably engage the aperture in the center of the compact disc.

The legs or times of the rosette are shaped such that they extend upwardly from the tray or base portion, curve outwardly, such that they can grip a compact disc, and then, towards their ends, curve inwardly to provide a boss, positioned over the hole in the compact disc, which may be manually pushed to release the CD.

It has long been recognized that the rosettes of conventional cases are not very satisfactory because it is often difficult to effect release of the CD. Such cases typically require two hands to release a disc and lift it from the rosette. Many people grasp an outer edge of the CD to facilitate removal of the disc, thereby bending the disc. Such bending can result in scoring of the recorded surface of the disc on the times, resulting in loss of data recorded on the disc. Consequently, much effort has been spent on improving the release mechanism for CD storage cases.

In spite of the difficulty experienced in purposely releasing CDs from conventional CD storage cases, such conventional cases are also subject to inadvertent release of a stored CD. This problem has been aggravated by the "improvements" to the release mechanisms for conventional cases which make it easier to release the stored CD. Inadvertent release of a CD often occurs when the CD and storage case are subjected to the movement and shocks which occur during shipment of the CD to the point of sale. After the CD has been inadvertently released, further movement and shocks may result in scratching of the recorded surface and loss of recorded data. Video library boxes are also susceptible to inadvertent release of the stored CD due to flexure of the lid and/or base portion of the case. Such flexure can result in contact between the inside surface of the lid portion, or materials mounted inside the lid portion, and the mechanism for releasing the CD.

British Patent Application GB 2 312 665 discloses apparatus for holding a CD within a case comprising a pair of disc engaging arms cantilevered from a base to an inner end forming a contact portion. Together, the contact portions of the two arms form a circular buttonlike member which is positioned over the opening in the CD. Pushing the button-like member releases the CD. The contact portions of the two arms are arranged such that gap between them lies away from the perpendicular to the arms. As taught by the '665 patent, such arrangement prevents the CD from being inadvertently released by a force which is perpendicular to the arms. Such apparatus does not prevent inadvertent release of a CD due to sudden shock or the imposition of other forces, including a release force applied to the button-like member by contact with the top portion of the case.

SUMMARY OF THE INVENTION

Briefly stated, the invention in a preferred form is a compact disc holder which includes a base portion and a rigid column extending laterally upward from the inner surface of the base portion to an inner end. The column has a longitudinally extending first disc-retaining lip and a bore extending laterally downward from the inner end of the column. At least one resilient arm extends laterally upward from the inner surface of the base portion to a upper end disposed within the bore of the column. The upper end portion forming an actuator member having a longitudinally extending second disc-retaining lip and an upper surface which is positioned below the inner end of the column. A compact disk retained by the first and second disc-retaining lips is released by inserting an object, such as a finger, into the bore of the column to engage and apply pressure to the upper surface of the actuator member. The pressure force depresses the resilient arm toward the inner surface of the base portion, causing the second disc-retaining lip to pivot away from and release the compact disc.

The column also has a slot extending laterally from the inner end.

The actuator member extends through the slot into the bore of the column. The upper surface of a portion of the actuator member disposed within the bore of the column has a concave shape for optimally positioning the finger of the user. The arm extends at an obtuse angle θ, the angle preferably having a value in the range of 95 to 105 degrees, from the inner surface of the base portion.

The disc holder also includes means for supporting the disc proximate to the column and arm. The disc support means has an upper surface which engages the lower surface of a compact disc proximate to the central aperture.

It is an object of the invention to provide apparatus for holding a compact disc, suitable for incorporating in a tray of a jewel case and in a video library box, which is reliable, easily operable to release a compact disc stored thereon, and prevents inadvertent release of a compact disc stored thereon.

It is also an object of the invention to provide an improved apparatus for holding a compact disc.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

With reference to the drawings wherein like numerals represent like parts throughout the several figures, a compact disc holder in accordance with the present invention is generally designated by the numeral 10. Compact disc holder 10, 10' may be utilized in any conventional compact disc case. For convenience, the disc holder is illustrated only in a conventional video library box 12, 12'.

Figure 1:
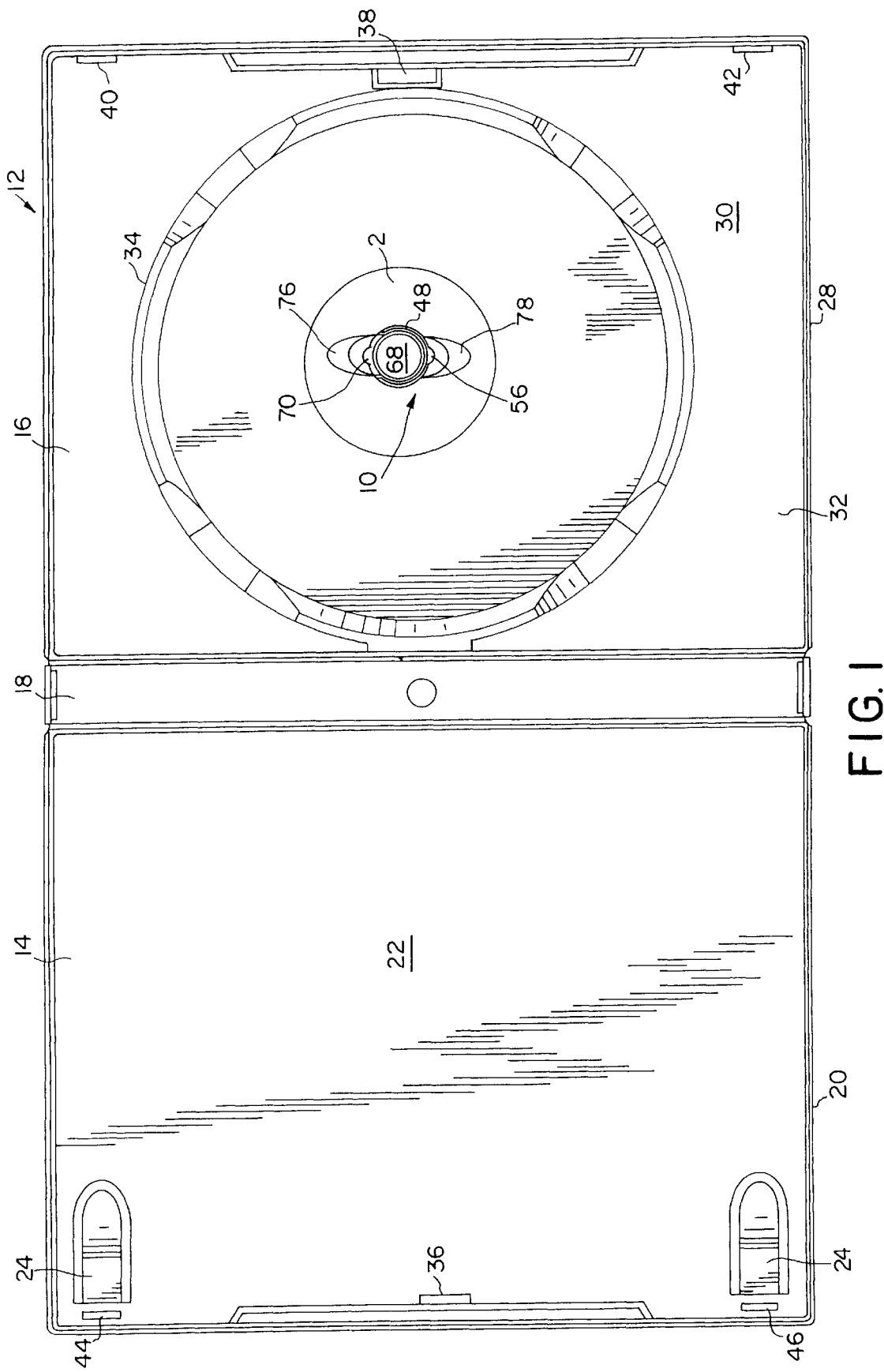
FIG. 1 is a top plan view of a video library box having a first embodiment of a compact disc holder in accordance with the invention.

With reference to FIG. 1, a video library box 12, 12' includes a lid portion 14, a base portion 16 and a spine portion 18, which connects the lid portion 14 to the base portion 16 and acts as a hinge.

The lid portion 14 includes a first lip 20 which extends laterally from the inside surface of a front cover 22 to define a first half of the enclosed volume of the box 12, 12'. Within the lid portion 14 resilient clip devices 24 are provided for holding a printed booklet or leaflet to be included with the disc 26 (FIG. 7). The base portion 16 includes a second lip 28 which extends laterally from the inside surface 30 of a back cover 32 to define the second half of the enclosed volume of the box 12, 12'. Within the base portion 1 6 is molded a partially annular rim 34 that provides some level of protection to the disc 26 should any loose booklet or the like be left in the box 12, 12'.

To allow the complete box 12, 12' to be formed in a one-shot, one-piece, molding operation, apertures and crevices are formed in the lid and base portions 14, 16. A clear plastic sheet may be welded across the outside of the box and a descriptive paper jacket or the like may be inserted between the box and the plastic sheet to identify the contents of the box 12, 12' and also to hide the apertures and crevices that might otherwise be deemed unsightly.

When the box 12, 12' is closed, a first male member 36 of a first closure clip on the lid portion 14 engages an associated first female member 38 of the clip provided on the base portion 16. Similarly, second and third male members 40, 42 of second and third closure clips on the base portion 16 are engaged with associated second and third female members 44, 46 provided on the lid/portion 14.

Figure 2:
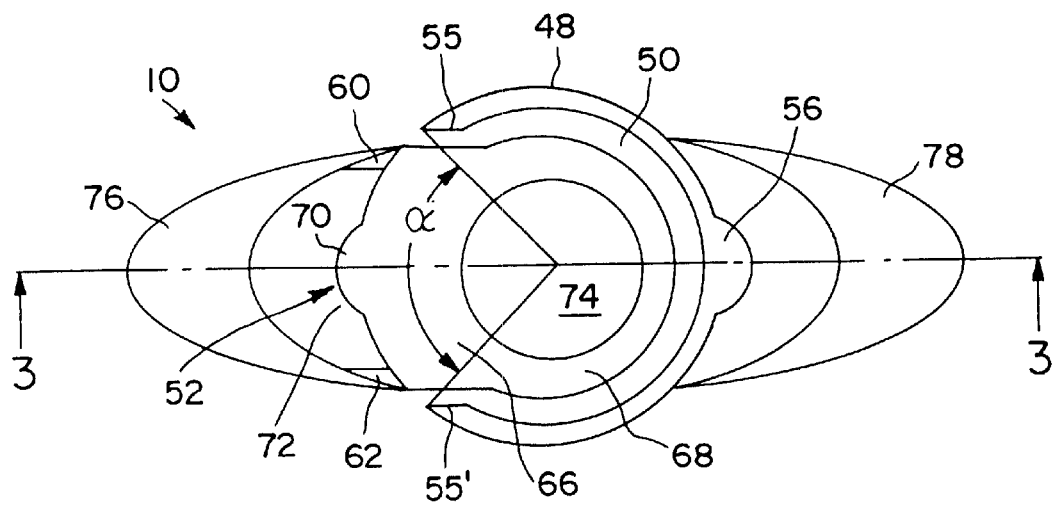
FIG. 2 is an enlarged plan view of area 2 of FIG. 1.

Molded integrally in the center of rim 34 is the apparatus 10, 10' for holding a compact disc 26 (FIGS. 2, 3, 5 and 6). The compact disc holder 10, 10' includes a rigid, cylindrical column 48 which extends laterally upward from the plane defined by the inside surface 30 of the back cover 32, Preferably, a bore 50 extends laterally upward through the cylindrical column 48 to define an interior. Access to the bore or interior 50 of the cylindrical column 48 is provided by a slot 52 in the column wall 54, formed by vertically extending edges 55, 55', that preferably extends the full height of the column 48. As shown in FIG. 2, slot 52 has an arc a having a value which is substantially less then 180°. A first, disc-retaining lip 56 extends longitudinally outward from the outer surface proximate to the upper end 58 of the cylindrical column 48. Preferably, the first lip 56 is positioned opposite the center of slot 52.

First and second resilient, radially spaced arms 60, 62 each extend laterally upward at an obtuse angle θ from the back cover 32 to an upper end 64 such that each arm 60, 62 is cantilevered from the back cover 32. Preferably, the value of θ is within the range of 95–105 degrees, such that the amount of cantilevering is very slight. The upper ends 64 of the arms 60, 62 are integrally formed with a common actuator member 66 which extends longitudinally through the slot 52 in the wall 54 of the cylindrical column 48 to the interior 50 of the column 48.

The portion of the actuator member 66 disposed within the column interior 50 forms a substantially circular actuator pad 68. A second, disc-retaining lip 70 extends longitudinally outward from the actuator pad 68. Preferably, the second lip 70 is positioned opposite the first lip 56 and above the gap 72 between the first and second arms 60, 62. The actuator pad 68 has a concave upper surface 74 to guide the user's finger to the optimum operating position. The upper surface 74 of the actuator pad 68 is positioned below the upper end 58 of the cylindrical column 48. Accordingly, the user's finger or other suitably shaped object must be inserted through the open upper end 58 of the cylindrical column 48 to depress the actuator member 66, as described more fully below.

Figure 3:
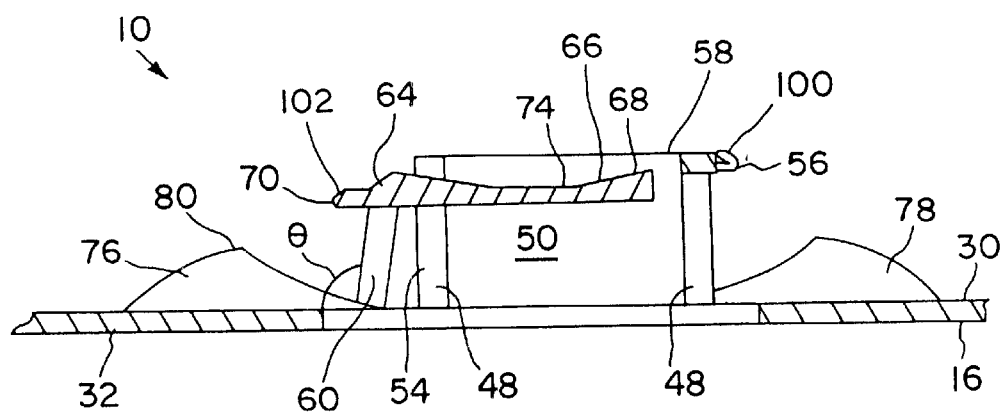
FIG. 3 is a cross-section view taken along line 3—3 of FIG. 2.
Figure 4:
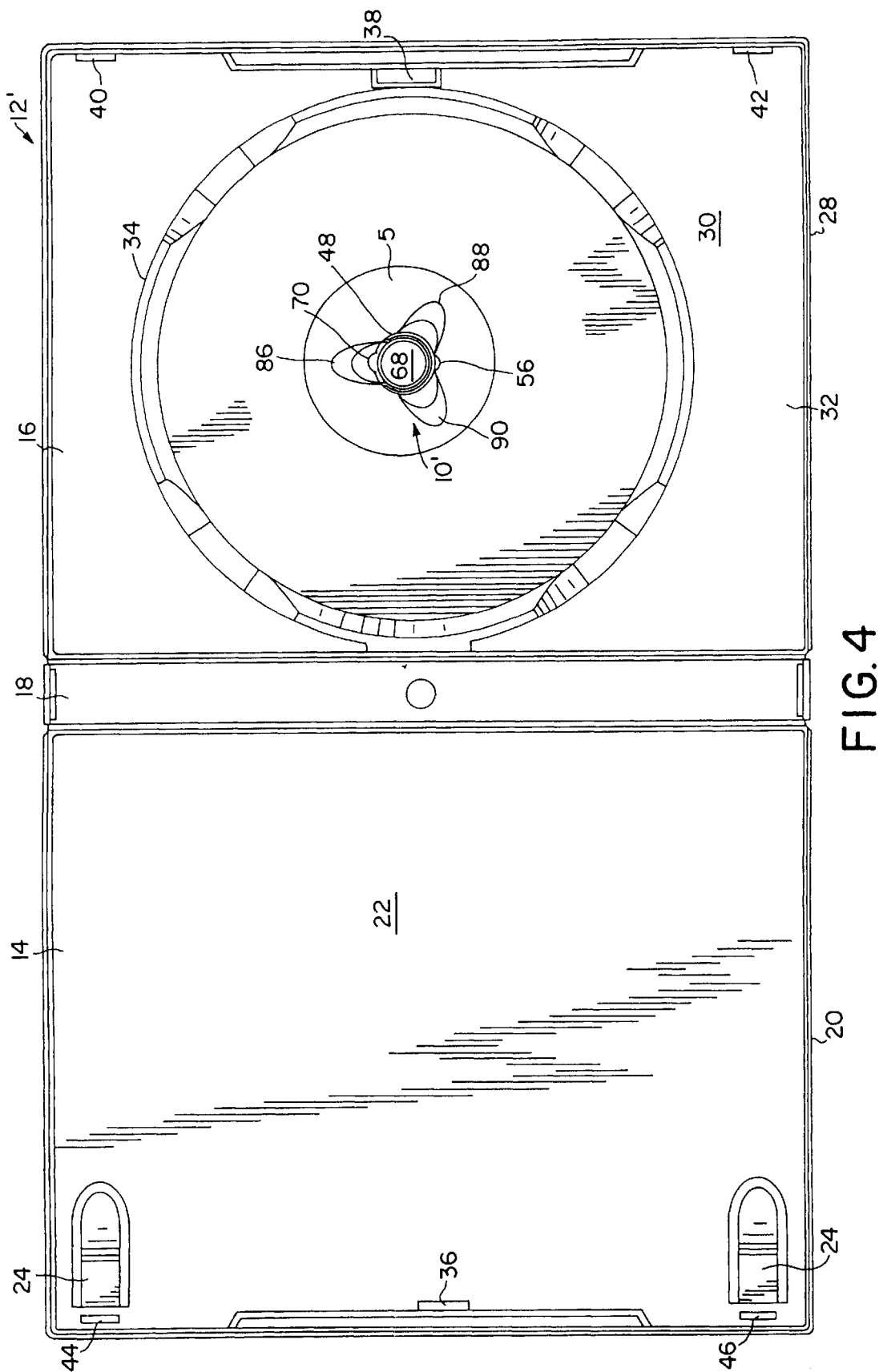
FIG. 4 is a top plan view of a video library box having a second embodiment of a compact disc holder in accordance with the invention.
Figure 7A:
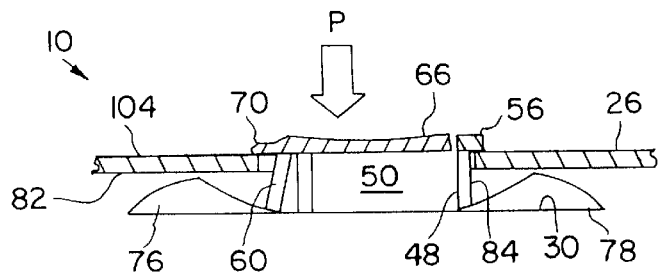
FIGS. 7a through 7d are cross-section views corresponding to FIG. 3 showing the operation of the release button of FIG. 1.

In a first embodiment, shown in FIGS. 1–3, the compact disc holder 10 includes a pair of oppositely disposed disc supports 76, 78 positioned proximate to column 48 and arms 60, 62. The upper surface 80 of the disc supports 76, 78 engage the lower surface 82 of the compact disc 26 in a region proximate to the central aperture 84 to hold the compact disc 26 at a distance above the back cover 32 (FIG. 7a). This prevents contact between the lower surface 82 of the compact disc 26 and the inner surface 30 of the back cover 32 that might cause damage to the lower surface 82 that would prevent optical data transfer there through. In a second embodiment, shown in FIGS. 4–6, the compact disc holder 10' includes a trio of radially spaced disc supports 86, 88, 90 that support the compact disc 26 in the same manner as the disc supports 76, 78 of the first embodiment 10.

Figure 5:
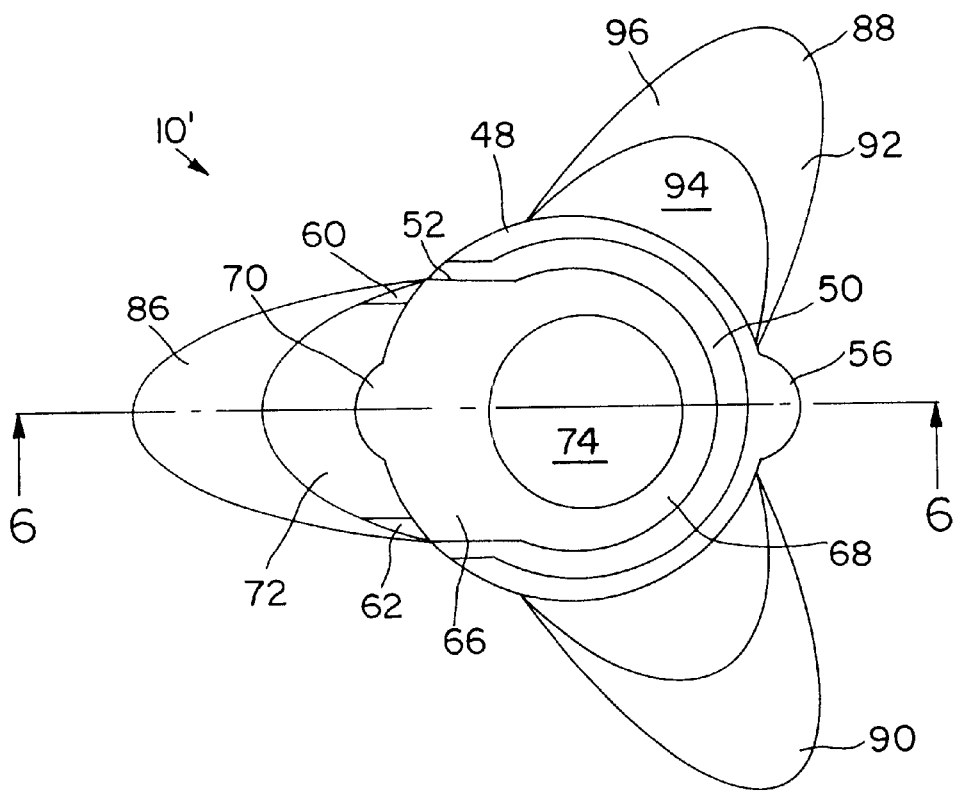
FIG. 5 is an enlarged plan view of area 5 of FIG. 4.
Figure 6:
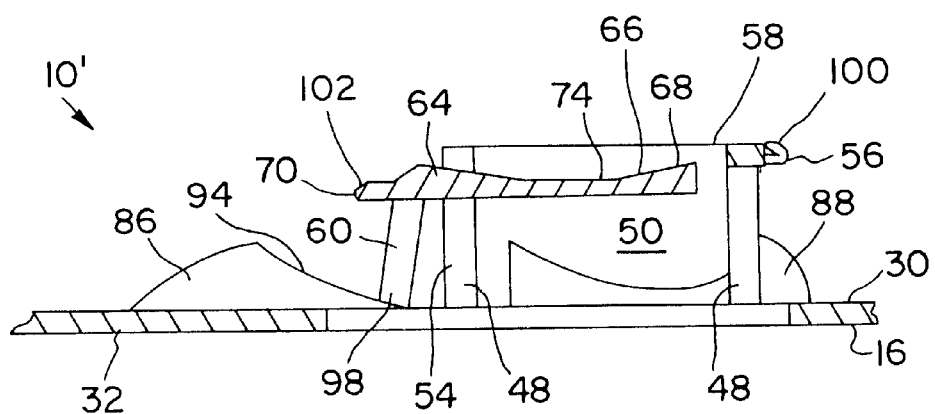
FIG. 6 is a cross-section view taken along line 6—6 of FIG. 5.

Each disc support 76, 78, 86, 88, 90 has three sides 92, 94, 96 and a triangular shape when viewed from the top with the base 94 of the triangle being disposed proximate to either column 48 or the arms 60, 62 (FIG. 5). In both embodiments, 10, 10', the lower ends 98 of the first and second arms 60, 62 are preferably integrally formed with the back cover 32 at the inner terminus, or base 94, of the first disc supports 76, 86. The sides 92, 94, 96 of the disc support 76, 78, 86, 88, 90 and the lines formed by the intersection of the sides have an arcuate shape.

To engage a compact disc 26 on the compact disc holder 10, 10', it is laid with its central aperture 84 resting over the cylindrical column 48 and the actuator member 66. The disc 26 is then manually pressed towards the back cover 32 of the base portion 16, whereupon the edges of the central aperture 84 ride over the chamfered upper edges 100, 102 of the first and second disc-retaining lips 56, 70. The downward pressure thus applied by the disc 26 to the actuator member 66 flexes the first and second arms 60, 62 towards the inside surface 30 of the back cover 32 causing the actuator member 66 to move towards the back cover 32 and pivoting the second disc-retaining lip 70 away from the edge of the central aperture 84. When the second disc-retaining lip 70 has been displaced laterally sufficiently to allow the first and second disc-retaining 56, 70 lips to pass through the central aperture 84, the arms 60, 62 resiliently revert to their unflexed positions.

As will be seen in FIG. 7a, the cylindrical column 48 and actuator member 66 are adapted to engage within the central aperture 84 of a compact disc 26 with lips 56 and 70 securely retaining the disc 26 by engaging the upper surface 104 thereof adjacent the central aperture 84.

Figure 7B:
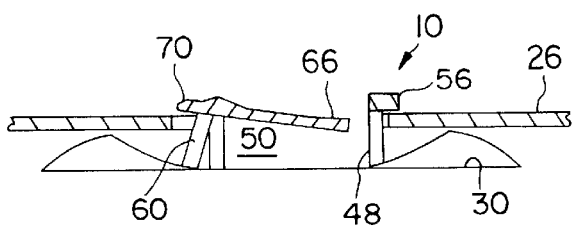
Figure 7C:
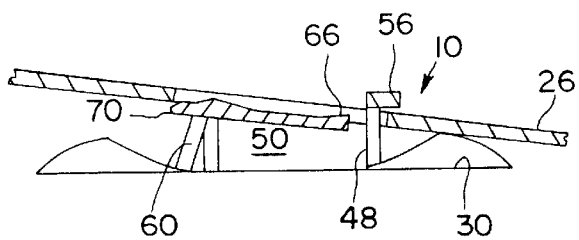
Figure 7D:
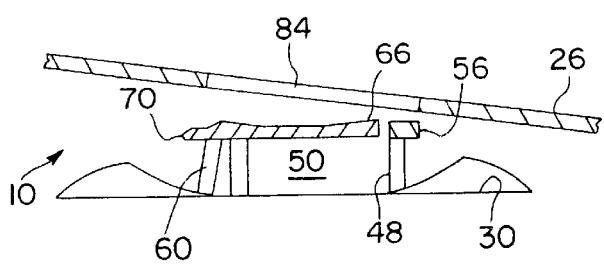

To release the disc 26 from the disc holder 10, 10', a finger or other similar sized object is inserted through the open upper end 58 of the cylindrical column 48 and pressure, such as indicated by the arrow "P" in FIG. 7a, is applied to the actuator pad 68 to depress the actuator member 66 and hence the arms 60, 62 towards the inner surface 30 of the back cover 32. As shown in FIG. 7b, depressing the actuator member 66 towards the back cover 32 operates to pivot the second disc-retaining lip 70 laterally upward and longitudinally inward, away from the upper surface 104 of the disc 26, thereby disengaging the second disc-retaining lip 70 from the upper surface 104 of the disc 26. As shown in FIGS. 7c and 7d, the compact disc 26 may then be easily removed from the box 12, 12' by grasping the outer edge of the disc 26, moving the disc 26 sideways to disengage the first disc-retaining lip 56 from the upper surface 104 of the disc 26, and lifting the disc 26 from the box 12, 12'.

It will thus be appreciated that the disc 26 can be reliably and easily removed from the disc holder 10, 10' by simply pressing the actuator pad 68 whereupon the disc 26 is released from engagement and the disc 26 can be easily gripped by its outer edge and removed from the apparatus. The first and second arms 60, 62 and the actuator member 66 are designed such that finger pressure will reliably release the disc 26 from engagement with the second lip 70.

It should be appreciated that the selected value of angle θ facilitates the pivotal movement of the second disc-retaining lip 70. An angle having a substantially higher value will result in a reduction in the lateral movement of lip 70 and an increase in the longitudinal movement. This combination can result in excessive wear to the second disc-retaining lip 70 and/or the edge of the central aperture 84 of the compact disc 26. An angle θ having a substantially lower value will result in a reduction in longitudinal movement of lip 70 and an increase in lateral movement, requiring the second disc-retaining lip 70 to pivot laterally to a greater extent to disengage from the edge of the central aperture 84 of the compact disc 26.

Although the apparatus 10, 10' described has two arms 60, 62 the apparatus 10, 10' may include more than two such arms, each having its upper end molded as a segment of a composite actuator member 66, or a single arm, having its upper end molded as an actuator member 66.

As mentioned above the lid portion 14, spine portion 18, and base portion 1 6, including the back cover 32, cylindrical column 48, arms 60, 62, and actuator member 66 are preferably formed as a one piece integral molding. The apparatus 10, 10' according to the invention may also be incorporated in a disc-holding tray for fitting in an otherwise conventional jewel-case.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Apparatus for holding a compact disc having data recorded thereon, a central aperture, and upper and lower surfaces, the apparatus comprising:
    a base portion having a longitudinally extending inner surface;
    a rigid column extending laterally upward from the inner surface of the base portion to an inner end, the column having a longitudinally extending first disc-retaining lip and defining a bore extending laterally downward from the inner end of the column and a slot; and
    a resilient arm extending laterally upward from the inner surface of the base portion to an upper end disposed within the bore of the column, the upper end forming an actuator member including a longitudinally extending second disc-retaining lip and an upper surface positioned below the inner end of the column;
    wherein a compact disk retained by the first and second disc-retaining lips is released by inserting an object into the bore of the column to engage and apply pressure to the upper surface of the actuator member, whereby the resilient arm is depressed toward the inner surface of the base portion and the second disc-retaining lip pivots away from and releases the compact disc.

2. The apparatus of claim 1 wherein the actuator member extends through the slot into the bore of the column.

3. The apparatus of claim 2 wherein a portion of the upper surface of the actuator member has a concave shape, the portion of the upper surface being disposed within the bore of the column.

4. The apparatus of claim 1 wherein the arm extends at an obtuse angle θ from the inner surface of the base portion.

5. The apparatus of claim 4 wherein the angle θ has a value in the range of 95 to 105 degrees.

6. The apparatus of claim 1 further comprising disc support means disposed proximate to the column and arm, the disc support means having an upper surface adapted for engaging the lower surface of a compact disc proximate to the central aperture.

7. The apparatus of claim 6 wherein the disc support means comprises a plurality of disc supports, each of the disc supports having three sides defining a triangular shape, each of the sides having an arcuate surface.

8. The apparatus of claim 6 wherein the disc support means comprises a pair of oppositely disposed disc supports.

9. The apparatus of claim 6 wherein the disc support means comprises three, radially spaced disc supports.

10. Apparatus for holding a compact disc, the apparatus comprising:
    a longitudinally extending base portion;
    a rigid column extending laterally upward from the base portion to an inner end, the column having a longitudinally extending first disc-retaining lip and defining a bore extending laterally downward from the inner end of the column and a slot;
    first and second resilient arms, each of the arms extending laterally upward from the base portion through the slot to an upper end disposed within the bore of the column, the upper end of each arm forming a common actuator member having a longitudinally extending second disc-retaining lip and an upper surface positioned below the inner end of the column; and
    a plurality of disc supports, each of the disc supports having an upper surface adapted for engaging the lower surface of the compact disc proximate to the central aperture;
    wherein a compact disk retained by the first and second disc-retaining lips is released by inserting an object into the bore of the column to engage and apply pressure to the upper surface of the actuator member, whereby the resilient arms are depressed toward the base portion and the second disc-retaining lip pivots away from and releases the compact disc.

11. The apparatus of claim 10 wherein each of the arms extend at an obtuse angle θ from the base portion.

12. The apparatus of claim 11 wherein the angle θ has a value in the range of 95 to 105 degrees.

13. The apparatus of claim 10 wherein the disc supports are disposed proximate to the column and the arms.

14. A box for storing a compact disc having a central aperture and oppositely disposed upper and lower surfaces, the box comprising:

a lid portion;

a base portion having a longitudinally extending inner surface and including a rigid column extending laterally upward from the inner surface of the base portion to an inner end, the-column being adapted for being received within the central aperture of a compact disc and having a longitudinally extending first disc-retaining lip and defining a bore extending laterally downward from the inner end of the column, the column also defining a slot, the first disc-retaining lip being adapted for engaging the upper surface of a disc, and at least one resilient arm extending laterally upward from the inner surface of the base portion to an upper end disposed within the bore of the column, the upper end forming an actuator member including a longitudinally extending second disc-retaining lip and an upper surface positioned below the inner end of the column, the second disc-retaining lip being adapted for engaging the upper surface of a disc; and a spine portion connecting the lid portion to the base portion;

wherein a compact disk stored in the box and retained by the first and second disc-retaining lips is released by opening the box and inserting an object into the bore of the column to engage and apply pressure to the upper surface of the actuator member, whereby each resilient arm is depressed toward the inner surface of the base portion and the second disc-retaining lip pivots away from and releases the compact disc.

* * * * *